(12) United States Patent
Utsumi et al.

(10) Patent No.: US 10,336,888 B2
(45) Date of Patent: Jul. 2, 2019

(54) SURFACE-TREATED CALCIUM CARBONATE FILLER FOR CURABLE RESIN COMPOSITION, AND CURABLE RESIN COMPOSITION CONTAINING FILLER

(71) Applicant: MARUO CALCIUM CO., LTD., Akashi-shi (JP)

(72) Inventors: Ryoji Utsumi, Akashi (JP); Shigeru Sakaguchi, Akashi (JP); Takaaki Nishioka, Akashi (JP)

(73) Assignee: MARUO CALCIUM CO., LTD., Akashi-shi (JP)

( * ) Notice: Subject to any disclaimer, the term of this patent is extended or adjusted under 35 U.S.C. 154(b) by 0 days.

(21) Appl. No.: 15/548,564

(22) PCT Filed: Mar. 18, 2016

(86) PCT No.: PCT/JP2016/058654
§ 371 (c)(1),
(2) Date: Aug. 3, 2017

(87) PCT Pub. No.: WO2016/152762
PCT Pub. Date: Sep. 29, 2016

(65) Prior Publication Data
US 2018/0016421 A1    Jan. 18, 2018

(30) Foreign Application Priority Data
Mar. 23, 2015   (JP) .................................. 2015-059316

(51) Int. Cl.
| | | |
|---|---|---|
| C08K 9/04 | (2006.01) | |
| C09C 3/08 | (2006.01) | |
| C09C 1/02 | (2006.01) | |
| C09J 11/06 | (2006.01) | |
| C08K 5/56 | (2006.01) | |
| C09J 201/10 | (2006.01) | |
| C09K 3/10 | (2006.01) | |
| C08L 101/10 | (2006.01) | |
| C08K 3/26 | (2006.01) | |
| C09J 11/04 | (2006.01) | |
| C01F 11/18 | (2006.01) | |

(52) U.S. Cl.
CPC .............. *C08K 9/04* (2013.01); *C01F 11/185* (2013.01); *C08K 3/26* (2013.01); *C08K 5/56* (2013.01); *C08L 101/10* (2013.01); *C09C 1/02* (2013.01); *C09C 1/021* (2013.01); *C09C 3/08* (2013.01); *C09J 11/04* (2013.01); *C09J 11/06* (2013.01); *C09J 201/10* (2013.01); *C09K 3/10* (2013.01); *C01P 2006/12* (2013.01); *C01P 2006/80* (2013.01); *C08K 2003/265* (2013.01); *C09K 3/1006* (2013.01); *C09K 2200/0239* (2013.01)

(58) Field of Classification Search
CPC ....................................................... C08K 9/04
See application file for complete search history.

(56) References Cited

U.S. PATENT DOCUMENTS

2003/0130411 A1 * 7/2003 Ishikawa ................ C08G 18/12
524/588
2012/0309877 A1   12/2012 Fujiwara

FOREIGN PATENT DOCUMENTS

| CN | 104263014 A | 1/2015 |
|---|---|---|
| JP | 2002-220547 A | 8/2002 |
| JP | 3650381 B2 | 5/2005 |
| JP | 2007-161515 A | 6/2007 |
| JP | 2007-197585 A | 8/2007 |
| JP | 2010-47722 A | 3/2010 |
| JP | 2010-077258 A | 4/2010 |
| JP | 2010-228976 A | 10/2010 |
| JP | 2013-216863 A | 10/2013 |
| JP | 2014-156525 A | 8/2014 |

(Continued)

OTHER PUBLICATIONS

Edited by Seishiro ITO; Ganryo no Jiten; First Edition; Tokyo; Asakura Publishing Co., Ltd.; 2000; p. 171, Front Sheet, End Sheet and 1 sheet translation (Table 11.3.5 indicated in ISR is translated) (4 Sheets total)/Cited in International Search Report.

(Continued)

*Primary Examiner* — Megan McCulley
(74) *Attorney, Agent, or Firm* — Kratz, Quintos & Hanson, LLP

(57) ABSTRACT

Provided are a surface-treated calcium carbonate filler useful in a curable resin, for imparting performance having excellent heat resistance, color fastness, strength and elongation, and a curable resin containing the filler.

A surface-treated calcium carbonate filler for a curable resin composition, in which calcium carbonate synthesized using compact limestone is treated by a surface treatment agent, the surface-treated calcium carbonate filler satisfying the following formulae (1) to (4):

$$0 \leq Mg \leq 2000, \quad (1)$$

$$0 \leq Fe \leq 200, \quad (2)$$

$$70 \leq SFa \leq 100, \text{ and} \quad (3)$$

$$0 \leq UFa \leq 30, \quad (4)$$

Mg: a proportion [ppm] of magnesium contained in surface-treated calcium carbonate, Fe: a proportion [ppm] of iron contained in surface-treated calcium carbonate, SFa: a proportion [wt %] of saturated fatty acid in the surface treatment agent comprising a water-soluble monovalent salt of a fatty acid, and UFa: a proportion [wt %] of unsaturated fatty acid in the surface treatment agent comprising a water-soluble monovalent salt of a fatty acid.

15 Claims, No Drawings

(56) References Cited

FOREIGN PATENT DOCUMENTS

| | | |
|---|---|---|
| JP | 2015-003835 A | 1/2015 |
| WO | 2011099154 A1 | 8/2011 |

OTHER PUBLICATIONS

International Search Report for International Application No. PCT/JP2016/058654 dated Jun. 14, 2016.

* cited by examiner

SURFACE-TREATED CALCIUM CARBONATE FILLER FOR CURABLE RESIN COMPOSITION, AND CURABLE RESIN COMPOSITION CONTAINING FILLER

TECHNICAL FIELD

The present invention relates to a surface-treated calcium carbonate filler for a curable resin composition, and a curable resin composition containing the filler, more particularly a surface-treated calcium carbonate filler, which has performance with excellent heat resistance, color fastness, strength and elongation over a long period of time, for example in the field of sealants filled in exterior wall joints in buildings, and which not only prevents peeling over a long period of time but also does not ruin designs because an adhesive existing in joints between tiles does not discolor in the field of tile adhesives of housing exterior walls, and a curable resin composition containing the filler.

BACKGROUND ART

A silicone resin composition and a modified silicone resin composition which have a crosslinkable silicon group such as a silanol group or a reactive silyl group at the end and which form a siloxane bond by hydrolysis and condensation reaction, a polyurethane resin composition having an isocyanate group at the end, a polysulfide resin composition having a thiol group at the end, and a modified polysulfide resin composition having a mercapto group at the end are widely used in various fields because their cured substances have excellent physical properties such as weather resistance, durability, heat resistance and cold resistance, and are used in large amounts as a sealing material, an adhesive, a floor material, a waterproof material and a coating material particularly in the architectural field. Although a resin mortar adhesive has been conventionally used particularly in the field of exterior tile adhesion, other materials with strong adhesive force have been required because of the problems of tile peeling and falling in recent years. A silicone modified epoxy adhesive having a crosslinkable silicon group has effects on not only the prevention of peeling due to aged deterioration but also the relaxation of vibration and impacts due to earthquakes by features having strong adhesion strength and also elastic function, and has become widespread at an astonishing speed because the actual results are recognized. Recently, as these curable resin compositions having a crosslinkable silicon group, those which have small changes in physical properties over a long period of time and have high durability and weather resistance, or those which can reduce external deterioration phenomena which ruin designs such as yellowing and fading have been needed, accompanied by requirements for long duration of architectural structures and houses.

It has been reported that a surface-treated calcium carbonate filler characterized by being subjected to wet surface treatment with at least one selected from the group consisting of metal soaps of saturated fatty acids having 8 or more carbon atoms, or metal soaps of unsaturated fatty acids, or metal soaps of alicyclic carboxylic acids and by not containing an alkali metal, has excellent heat resistance in a dry state and imparts thixotropic properties, slump resistance and good storage stability to curable resin compositions (Patent Literature 1).

It has also been reported that a paste resin composition with a low viscosity and excellent storage stability can be obtained by surface-treated calcium carbonate in which the total proportion of sodium salt and potassium salt of lauric acid, palmitic acid and stearic acid is 30 to 60 wt %, and the proportion of sodium salt and potassium salt of unsaturated fatty acids is 5 wt % or less (Patent Literature 2).

A sealing material composition which has good weather resistance, storage stability and water resistance and has a little reduction in elongation after heat exposure or for a long period of time has been further reported (Patent Literature 3). It is a sealing material composition which shows features having good weather resistance, storage stability and water resistance and a little reduction in elongation after heat exposure or for a long period of time by combining a curable resin having a hydrolyzable silyl group, which has a urethane bond or a urea bond in the molecule, and one or more compounds selected from a silane compound, boron trifluoride and/or a complex compound, a fluorinating agent, and an alkali metal salt of a polyvalent fluoro compound.

CITATION LIST

Patent Literature

Patent Literature 1: Japanese Patent No. 3650381
Patent Literature 2: Japanese Unexamined Patent Application Publication No. 2010-228976
Patent Literature 3: Japanese Unexamined Patent Application Publication No. 2010-47722

SUMMARY OF INVENTION

Technical Problem

For the above-described curable resin compositions, surface-treated calcium carbonate generally synthesized using compact limestone is used. Compact limestone which naturally occurs is collected, calcined and hydrolyzed to prepare calcium hydroxide, which is allowed to react with carbon dioxide gas to synthesis calcium carbonate. Impurities are chemically and mechanically removed to some extent, and surface treatment is carried out to produce surface-treated calcium carbonate. The proportion of impurities in this compact limestone varies depending on the source of a vein. Though impurities such as silica, aluminum, magnesium and iron components in ore can be removed during synthesizing calcium carbonate to some extent, it is difficult to completely remove them. Magnesium and iron components particularly remain, which is one of the causes of external defects, for example the discoloration of a curable resin composition having a crosslinkable silicon group.

In Patent Literature 1 above, in order to obtain surface-treated calcium carbonate not containing an alkali metal by the reaction of a water-insoluble metal soap and a saturated fatty acid, an unsaturated fatty acid and an alicyclic fatty acid, which has 8 or more carbon atoms, there is a problem in that stable quality is not obtained depending on temperature and time during production.

In Patent Literature 2 above, the effect on storage stability is observed, however, depending on the amount of magnesium and iron contained, the color of a paste composition cannot be maintained by heat and ultraviolet rays, which reduce whiteness, and discoloration occurs by turning reddish or yellowish, and therefore designs can be ruined.

Furthermore, in Patent Literature 3, surface-treated calcium carbonate is not described, and discoloration by magnesium and iron is not described, either.

In view of such circumstances, the present invention solves the problems of the conventional techniques described above, and provides a surface-treated calcium carbonate filler having performance with excellent heat resistance, color fastness, strength and elongation over a long period of time when blended with a curable resin composition, and a curable resin composition containing the filler.

Solution to Problem

As a result of repeated diligent investigations for the purpose of solving the above-described problems, the present inventors found that a surface-treated calcium carbonate filler synthesized using compact limestone, in which among metal components contained in the surface-treated calcium carbonate filler, the magnesium component is 2000 ppm or less and the iron component is 200 ppm or less, and which is surface-treated with fatty acids comprising a water-soluble monovalent salt, in which the proportion of saturated fatty acid is 70 to 100% and the proportion of unsaturated fatty acid is 0 to 30%, can show performance with excellent heat resistance, color fastness, strength and elongation when blended with a curable resin, particularly a curable resin having a crosslinkable silicon group, thereby completing the present invention.

The present invention is characterized by the following.

1. A surface-treated calcium carbonate filler for a curable resin composition, in which calcium carbonate synthesized using compact limestone is treated by a surface treatment agent, the surface-treated calcium carbonate filler) satisfying the following formulae (1) to (4);

$$0 \leq Mg \leq 2000 \text{ [ppm]}, \quad (1)$$

$$0 \leq Fe \leq 200 \text{ [ppm]}, \quad (2)$$

$$70 \leq SFa \leq 100 \text{ [wt \%], and} \quad (3)$$

$$0 \leq UFa \leq 30 \text{ [wt \%]}, \quad (4)$$

wherein,
Mg: a proportion [ppm] of magnesium contained in surface-treated calcium carbonate,
Fe: a proportion [ppm] of iron contained in surface-treated calcium carbonate,
SFa: a proportion [wt %] of saturated fatty acid in the surface treatment agent comprising a water-soluble monovalent salt of a fatty acid, and
UFa: a proportion [wt %] of unsaturated fatty acid in the surface treatment agent comprising a water-soluble monovalent salt of a fatty acid.

2. A curable resin composition containing the following components (A), (B) and (C):
(A) a curable resin having a crosslinkable silicon group,
(B) a crosslinkable curing catalyst, and
(C) the surface-treated calcium carbonate filler defined in claim 1.

3. A curable resin composition in which the curable resin having a crosslinkable silicon group (A) is at least one selected from the group consisting of silicone resins, modified silicone resins, acrylic silicone resins, silicone modified epoxy resins, silyl-terminated polyisobutylene resins, silylated acrylate resins and silylated urethane resins.

4. A curable resin composition in which the crosslinkable curing catalyst (B) is at least one selected from the group consisting of organometallic catalysts comprising tin, titanium, bismuth, zirconium and aluminum, amine compounds and boron compounds.

5. A curable resin composition containing the following components (D), (E) and (F):
(D) at least one curable resin selected from the group consisting of polyurethane resins, polysulfide resins and modified polysulfides,
(E) a curing catalyst, and
(F) the surface-treated calcium carbonate filler according to claim 1.

6. A curable resin composition in which the curable resin composition is a sealing material or an adhesive.

7. A curable resin composition in which the curable resin composition is a one component type.

Advantageous Effects of Invention

By blending the surface-treated calcium carbonate synthesized using compact limestone of the present invention with a curable resin, performance with excellent heat resistance, color fastness, strength and elongation is retained over a long period of time, for example in the field of sealants filled in exterior wall joints in buildings, and the effects of not only preventing peeling over a long period of time but also not ruining designs because an adhesive existing in joints between tiles does not discolor are obtained in the field of tile adhesives of housing exterior walls. The reason why the effects are shown is not always clear, but is supposed as follows.

A factor that physical properties are deteriorated by heat resistance and color fastness is radical formation by deterioration of organic substances. In particular, colloidal calcium carbonate synthesized using compact limestone is generally coated with a surface treatment agent such as a saturated fatty acid and an unsaturated fatty acid, and thus the deterioration of the surface treatment agent by heat (radical formation) occurs. The deterioration and discoloration by these radicals are prevented by catching radicals using an antioxidant and the like, however, this preventing effect is not permanent because the amount of antioxidant blended is small. Therefore, it is supposed that deterioration occurs in the form of discoloration in the long term because radicals which are not caught react with metal components in a crosslinkable curing catalyst and magnesium and iron components contained in surface-treated calcium carbonate. In general, unsaturated fatty acids having a double bond have lower heat resistance and a higher rate of radical formation. On the other hand, saturated fatty acids have higher heat resistance but have properties not to easily surface-treat calcium carbonate. Therefore, it is supposed that by not only balancing the proportion of saturated fatty acid and unsaturated fatty acid but also limiting the amount of magnesium and the amount of iron when synthesizing compact limestone to a certain amount or less, the radical formation by heat deterioration of a surface treatment agent is suppressed, and the effect of suppressing deterioration phenomena such as coloration by reaction with a metal component is provided.

DESCRIPTION OF EMBODIMENTS

Calcium carbonate has natural calcium carbonate (heavy calcium carbonate) and synthetic calcium carbonate (colloidal calcium carbonate). The natural calcium carbonate is directly produced from saccharoidal limestone, and can be produced for example by mechanically crushing and sorting saccharoidal limestone ore. The synthetic calcium carbonate is produced after compact limestone is calcined in a firing furnace such as kiln to obtain calcium oxide, which is hydrolyzed with water to obtain calcium hydroxide, and can be produced for example by the reaction of calcium hydroxide with carbon dioxide gas. In general, colloidal calcium carbonate synthesized using compact limestone can be controlled to uniform particles and impurities in ore can be relatively easily removed, and thus surface-treated calcium carbonate is synthesized predominantly using compact limestone. However, this compact limestone contains metal oxides such as iron and magnesium in large amounts depending on sources in some cases, and the metal oxides easily cause the deterioration and discoloration of a curable resin composition, and thus it is required to select compact limestone from a source which has metal oxides in as small amount as possible. For the intended uses of the present invention, the amount of magnesium contained is 2000 ppm or less, and more preferably 1000 ppm or less. An amount of over 2000 ppm is not preferred because an influence on discoloration becomes larger and strength and elongation are reduced. In addition, the amount of iron contained is 200 ppm or less, and more preferably 100 ppm or less. An amount of over 200 ppm is not preferred because like magnesium, an influence on discoloration becomes larger and strength and elongation are reduced. These amounts are values measured by atomic absorption spectrophotometer (AA-6700F manufactured by SHIMADZU CORPORATION).

These amounts are measured in the following method.

[Method for Preparing Sample]

Into a crucible, 1 g of sample is put, and the sample is calcined at 300° C. for 3 hours. After this, the sample, 30 ml of distilled water and 7.5 ml of nitric acid (Nitric acid (1.38) 140-04016 for Analysis of Organic Metals manufactured by Wako Pure Chemical Industries, Ltd.) are put into a 200 ml beaker, which is covered with a watch glass and heated and stirred with electric heating until the sample is melted. After cooling to ordinary temperature, a solution is added to make 100 ml using a 100 ml volumetric flask. In the case of Mg metal, 1 ml of a lanthanum chloride solution (124-02351 for Atomic Adsorption Spectrochemical Analysis manufactured by Wako Pure Chemical Industries, Ltd.) is put into a volumetric flask, and distilled water is then added to make 100 ml. In the case of Fe metal, a lanthanum chloride solution is not put into a volumetric flask, and distilled water is added to make 100 ml. After that, the obtained solution is filtered through 5C paper filter to obtain a sample solution.

[Method for Measuring Mg Metal and Fe Metal]

The amount of Mg metal and Fe metal contained is obtained in the calibration curve method by atomic absorption spectrophotometer (AA-6700F manufactured by SHIMADZU CORPORATION).

The surface-treated calcium carbonate for a curable resin composition of the present invention is required to be synthetic calcium carbonate, and the BET specific surface area Sw is preferably 5 to 40 $m^2/g$. When the BET specific surface area Sw is less than 5 $m^2/g$, it tends to be difficult to impart sufficient thixotropic properties. When the BET specific surface area Sw is over 40 $m^2/g$, the amount of surface treatment agent required to coat a surface becomes larger, and the strength of a curable resin composition tends to be reduced. The BET specific surface area Sw is further preferably 6 to 35 $m^2/g$.

The BET specific surface area Sw is a value when surface-treated calcium carbonate is measured in the BET method by the nitrogen adsorption method, and is measured by the following method.

[Method for Preparing Sample]

Into a glass cell, 300 mg of sample is put, and the sample is pretreated at 200° C. for 10 minutes with nitrogen through the cell at 25 ml/min, and then cooled at ordinary temperature to obtain a measurement sample.

[Method for Measuring BET Specific Surface Area]

The BET specific surface area is measured in the one-point method by the BET specific surface area analyzer (Macsorb HM model-1210 manufactured by Mountech Co., Ltd.)

In general, the surface treatment of synthetic calcium carbonate (surface coating) is carried out by wet treatment. At this time, surface treatment agents generally used are fatty acids and fatty acid derivatives; water-soluble monovalent salts such as a sodium salt, a potassium salt, an ammonium salt and an amine salt. These react with a calcium ion in a slurry of calcium carbonate and the calcium carbonate surface is substituted to obtain a calcium salt, whose counter ion is a divalent salt of a fatty acid. However, part of them can remain as a sodium salt, a potassium salt, an ammonium salt, an amine salt and a fatty acid. When the proportion of remaining sodium salt, potassium salt, ammonium salt, amine salt and fatty acid is great, radical formation easily occurs by heat because they are free, and thus it is required that the type of fatty acid and the constituent proportion be balanced. Fatty acids are generally separated into saturated fatty acids and unsaturated fatty acids, and saturated fatty acids are stronger in view of heat resistance, and thus saturated fatty acids are preferably contained in large amounts. The proportion of saturated fatty acid is 70 to 100%, preferably 85 to 100%, and more preferably 90 to 95%. When the proportion of saturated fatty acid is less than 70%, the proportion of unsaturated fatty acid with weak heat resistance becomes greater, and thus radical formation due to heat deterioration increases, which causes a reduction in physical properties such as strength and elongation and an increase in discoloration. The proportion of unsaturated fatty acid is 0 to 30%, preferably 0 to 15%, and more preferably 5 to 10%.

The surface treatment agents used in the present invention include for example a sodium salt, a potassium salt, an ammonium salt and an amine salt of saturated fatty acids, unsaturated fatty acids, alicyclic carboxylic acids and resin acids and the like, and these are used alone or two or more of these are used in combination as needed.

Saturated fatty acids are preferably saturated fatty acids having 6 to 31 carbon atoms, further preferably those having 8 to 26 carbon atoms, and further preferably those having 9 to 21 carbon atoms. Specific examples of saturated fatty acids include butyric acid, caproic acid, caprylic acid, pelargonic acid, capric acid, undecanoic acid, lauric acid, myristic acid, palmitic acid, stearic acid, arynic acid, behenic acid, lignoceric acid, cerotic acid, montanic acid, melissic acid and the like. These are used alone or two or more of these are used in combination as needed. Among these, palmitic acid, stearic acid and lauric acid are preferred.

Unsaturated fatty acids are fatty acids having a double bond in a molecule, and are synthesized for example by the dehydration reaction of a saturated fatty acid. The unsaturated fatty acids are preferably unsaturated fatty acids having 6 to 31 carbon atoms, more preferably those having 8 to 26 carbon atoms, and further preferably those having 9 to 21 carbon atoms. Specific examples of unsaturated fatty acids include obtusilic acid, caproleic acid, undecylenic acid, linderic acid, tsuzuic acid, physeteric acid, myristoleic acid, palmitoleic acid, petroselinic acid, oleic acid, elaidic acid, ascrebic acid, vaccenic acid, gadoleic acid, gondoic acid, cetoleic acid, erucic acid, brassidic acid, selacholeic acid, ximenic acid, lumequeic acid, sorbic acid, linoleic acid and the like. These are used alone or two or more of these are used in combination as needed. Among these, oleic acid, erucic acid and linoleic acid are preferred.

In addition, for example, fatty acids derived from animals such as beet tallow and lard and fatty acids derived from plants such as palm and palm tree, in which the above fatty acids are mixed, are also preferably used. These are used alone or two or more of these are used in combination as needed.

Alicyclic carboxylic acids include naphthenic acid and the like. Resin acids include abietic acid, pimaric acid, palustric acid, neoabietic acid and modified rosins thereof typified by disproportionated rosin, hydrogenated rosin, dimeric rosin and trimeric rosin and the like. Furthermore, sulfonic acids typified by alkylbenzene sulfonic acid and a sodium salt, a potassium salt, an ammonium salt and an amine salt thereof and the like are also used. These are used alone or two or more of these are used in combination as needed.

The method for surface treatment is not particularly limited, and in the case of the surface treatment of synthetic calcium carbonate, surface treatment is preferably carried out by adding an adjusted treatment agent to a water slurry of the synthetic calcium carbonate and stirring the obtained mixture or kneading the treatment agent into a hydrated cake of the synthetic calcium carbonate.

In the case of surface treatment in a water slurry, a water slurry of synthetic calcium carbonate has preferably a concentration of 10 to 800 g $CaCO_3$/L. A concentration of lower than 10 g $CaCO_3$/L is unfavorable in productivity. On the other hand, when the concentration is higher than 800 q $CaCO_3$/L, the viscosity of the water slurry becomes higher, and a surface treatment agent does not sufficiently permeate in some cases, and thus there is a possibility that an intended filler will not be obtained.

In the case of surface treatment in a water slurry, the temperature of surface treatment is preferably 20 to 98° C., more preferably 40 to 90° C., and further preferably 60 to 80° C. A surface treatment temperature of lower than 20° C. is not preferred because an adsorption bond to calcium carbonate does not easily take place and surface treatment is unequal. A treatment temperature of higher than 98° C. is not preferred because, though the effect of the present invention is sufficiently obtained, there is a risk of boiling, which is dangerous and also needs to prepare a pressure resistant device.

In the case of a hydrated cake or dry treatment, the temperature is preferably 20 to 150° C., more preferably 40 to 130° C., and further preferably 60 to 120° C. A surface treatment temperature of lower than 20° C. is not preferred because an adsorption bond to calcium carbonate does not easily take place, and there is a risk that surface treatment is unequal. A surface treatment temperature of higher than 150° C. is not preferred because a surface treatment agent is deteriorated by heat, and there is a risk of change in quality, and a pressure resistant device is also required.

After the surface treatment by the above method, the calcium carbonate filler of the present invention can be obtained by the steps such as dehydration, drying and crushing, followed by powderization according to a common method.

The amount of surface treatment agent to solid contents in calcium carbonate is preferably 0.5 to 20.0 wt %, and more preferably 1.0 to 15.0 wt %. When the amount is less than 0.5 wt %, there is a risk that untreated surfaces exist, which can cause an increase in viscosity after storage to reduce storage stability. When the amount is over 20.0 wt %, a surface treatment agent is excessive, and sufficient strength cannot be obtained in some cases.

The loss on heating per g of surface-treated calcium carbonate at 200° C. to 500° C. (the amount of surface treatment agent) Tg is preferably 4.5 to 150.0 mg/g, and more preferably 9.0 to 120.0 mg/g. When the loss on heating is less than 4.5 mg/g, there is a risk that untreated surfaces exist, which can cause an increase in viscosity after storage to reduce storage stability. When the loss on heating is over 150.0 mg/g, a surface treatment agent is excessive, and sufficient strength cannot be obtained in some cases.

The amount of surface treatment agent per unit specific surface area in the surface-treated calcium carbonate for a curable resin composition of the present invention As is preferably 1.9 to 3.5 mg/m². When the amount of surface treatment agent per unit specific surface area As is less than 1.9 mg/m², there is a risk that untreated surfaces exist, which can cause an increase in viscosity after storage to reduce storage stability. When the amount of surface treatment agent per unit specific surface area As is above 3.5 mg/m², a surface treatment agent is excessive, and sufficient strength cannot be obtained in some cases. The amount of surface treatment agent per unit specific surface area As is further preferably 2.1 to 2.8 mg/m².

The amount of surface treatment agent per unit specific surface area As [mg/m²] is calculated by Loss on heating Tg/BET specific surface area Sw, and Tg is measured by the following method.

Tg: loss on heating per g of surface-treated calcium carbonate at 200° C. to 500° C. [mg/g]

[Method for Measuring Loss on Heating]

When 30 mg of surface-treated calcium carbonate is collected in a sample pan (platinum) with a diameter of 5 mm and a depth of 5 mm and temperature is increased at a temperature increasing rate of 15° C./min from ordinary temperature to 510° C., the loss on heating at 200° C. to 500° C. is measured using a thermal analyzer (Thermo Plus EVO II manufactured by Rigaku Corporation), and the loss on heating per g of surface-treated calcium carbonate (the amount of surface treatment agent) (mg/q) is obtained.

The curable resin used in the curable resin composition of the present invention is preferably a resin particularly having a crosslinkable silicon group such as a silanol group or a reactive silyl group at the end, and examples thereof include silicone resins and modified silicone resins, which form a siloxane bond by hydrolysis and condensation reaction, acrylic silicone resins, silicone modified epoxy resins, silyl-terminated polyisobutylene resins, silylated acrylate resins, silylated urethane resins and the like and also include polyurethane resins, polysulfide resins, modified polysulfide resins and the like.

These are used alone or two or more of these are used in combination as needed.

The silicone resins include organopolysiloxanes represented by the following general formula (1).

[Chem. 1]

(1)

(wherein, R is a monovalent hydrocarbon group, and n is an integer to obtain a viscosity at 25° C. of 10 to 1000000 centistokes.)

In the above-described general formula (1), R is a substituted or unsubstituted monovalent hydrocarbon group, and preferably an unsubstituted or substituted monovalent hydrocarbon group having 1 to 10 carbon atoms, more preferably 1 to 8 carbon atoms. Examples thereof include alkyl groups such as a methyl group, an ethyl group, a propyl group, a butyl group and a hexyl group, aryl groups such as a phenyl group and a tolyl group, alkenyl groups such as a vinyl group, a butenyl group and a hexenyl group, cycloalkyl groups such as a cyclohexyl group, aralkyl groups such as a benzyl group and a 2-phenylethyl group, or groups in which a part or all of hydrogen atoms bound to carbon atoms in these groups are substituted with a halogen atom and a cyano group, including such as a chloromethyl group, a trifluoropropyl group and a cyanoethyl group, and the like, and particularly a methyl group, a phenyl group, a vinyl group and a trifluoropropyl group are preferred. It should be noted that n is a number corresponding to the degree of polymerization, and the viscosity at 25° C. is 10 to 1000000 centistokes (cst), and preferably 500 to 100000 cst in terms of working properties. The organopolysiloxanes represented by such formula (1) can specifically include compounds represented by the following general formula (2).

[Chem. 2]

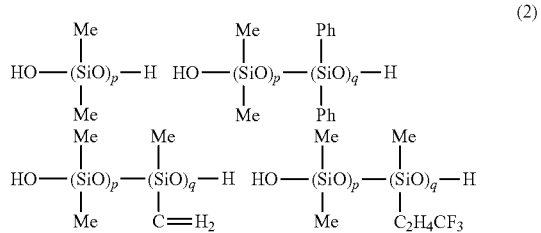

(2)

(wherein, Me is a methyl group, Ph is a phenyl group, p and q are each a positive integer, and p+q is an integer corresponding to n.)

Next, an organosilicon compound having at least two or more groups which can be hydrolyzed, selected from an acetoxy group, a ketoxime group, an alkenoxy group, an aminooxy group and an amino group in a molecule, or a partial hydrolysate thereof acts as a cross-linking agent for the above-described organopolysiloxanes, and is an essential component to cure the composition of the present invention at room temperature in the presence of water. It is preferred that three or more groups which can be hydrolyzed described above be contained in a molecule. When this organosilicon compound has an organic group other than a hydrolyzable group which can be bound to a silicon atom, the group is preferably the same substituted or unsubstituted monovalent hydrocarbon group as in R in the above polyorganosiloxanes, and particularly an alkyl group having 1 to 8 carbon atoms, an alkenyl group having 2 to 10 carbon atoms and a phenyl group are preferred in the respect that synthesis is easy.

Specific examples of such organosilicon compound include methyltris methylethylketoxime silane, vinyltris methylethylketoxime silane, methyltrisacetoxysilane, ethyltrisacetoxysilane, vinyltrisacetoxysilane, methyltrismethoxysilane, ethyltrismethoxysilane, vinyltrismethoxysilane, acetamide silane, aminoxysiloxane, methyltris cyclohexyl aminosilane, methyltris isopropenoxy silane, tetraethoxysilane, tetrapropoxysilane, diacetoxymethylsilane, diacetoxydimethylsilane, diacetoxymethylvinylsilane, methyltriacetoxysilane, triacetoxyvinylsilane, tetraacetoxysilane, ethyltriacetoxysilane, diacetoxymethylphenylsilane, methyltri(butanoxime)silane, vinyltri(butanoxime)silane, phenyltri(butanoxime)silane, propyltri(butanoxime)silane, methyltriisopropenoxysilane, triisopropenoxysilane, tetrapropenoxysilane, phenyltrialkenoxysilane, isopropylpropenoxysilane, butyltripropenoxysilane, vinyltripropenoxysilane and the like. These organosilicon compounds can be used alone or by mixing two or more organosilicon compounds, however, it is preferred that for stable production, organosilicon compounds having an identical hydrolyzable group be used alone or two or more of the organosilicon compounds be used in combination.

The amount of organosilicon compound or partial hydrolysate thereof described above, a cross-linking agent, is 1 to 30 parts, particularly preferably 3 to 10 parts with respect to 100 parts of organopolysiloxane (parts by weight, the same applies hereinafter). When the amount is lower than 1 part, the curing of a composition becomes insufficient, and preservation stability can be worse. On the other hand, when the amount is over 30 parts, a cured substance to be obtained is hard and fragile, and product performance as a sealing material and cost-effectiveness can be lost.

The modified silicone resins are those which have silyl-terminated polyether having a reactive silyl group, a silicon group, introduced at the end as a main component, and form a siloxane bond by the reaction of this and water to cure, and those which are commercially available can be used. Examples thereof include MS Polymers S203 and S303 manufactured by KANEKA CORPORATION, EXCESTARs S2410, S2420 and S3430 manufactured by ASAHI GLASS CO., LTD. and the like. These are used alone or two or more of these are used in combination as needed. Furthermore, a silicone resin and a modified silicone resin can be combined as needed.

The acrylic silicone resins are those which have a reactive silyl group, a silicon group, introduced at the end and has an acrylic polymer as the main chain, and form a siloxane bond by the reaction of this and water to cure, and those which are commercially available can be used. Examples thereof include Polymer S943 manufactured by KANEKA CORPORATION and the like. These can be used alone or can be combined with a modified silicone resin as needed.

The silicone modified epoxy resins are those which are obtained by introducing an epoxy group into a polymer having a reactive silyl group, a silicon group, introduced at the end, and examples thereof include Silyl manufactured by KANEKA CORPORATION and the like.

The silyl-terminated polyisobutylene resins are those which have a silyl-terminated polyisobutylene having a reactive silyl group introduced at the end as a main component and form a siloxane bond by a condensation reaction, and examples thereof include Polymers EP505S and EP303S manufactured by KANEKA CORPORATION and the like.

The silylated acrylate resins are those which have a silylated polyacrylate having a silyl group introduced at the end of the molecular chain in an acrylic oligomer as a main component and form a siloxane bond by moisture curing.

The silylated urethane resins are those which have a reactive silyl group, a silicon group, introduced at the end and have a polymer by urethane bond reaction of polyoxypropylene glycol and an isocyanate in the main chain.

The plasticizers used in the curable resin composition of the present invention include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butyl benzyl phthalate (BBP), dicyclohexyl phthalate (DCHP), tetrahydrophthalic ester, dioctyl adipate (DOA), diisononyl adipate (DINA), diisodecyl adipate (DIDA), di-n-alkyl adipate, dibutyl diglycol adipate (BXA), bis(2-ethylhexyl)azelate (DOZ), dibutyl sebacate (DBS), dioctyl sebacate (DOS), dibutylmaleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl)phosphate (TOP), tri (chloroethyl)phosphate (TCEP), trisdichloropropyl phosphate (CRP), tributoxyethyl phosphate (TBXP), tris(β-chloropropyl)phosphate (TMCPP), triphenyl phosphate (TPP), octyl diphenyl phosphate (CDP), acetyl triethyl citrate, acetyl tributyl citrate and the like, and further, trimellitic acid plasticizers, polyester plasticizers, chlorinated paraffin, stearic acid plasticizers and the like, and furthermore silicone oil such as dimethylpolysiloxane, and recently polyoxypropylene glycol-series, paraffin-series, naphthene-series and isoparaffin-series petroleum-based high-boiling solvents and the like. These are used alone or two or more of these are used in combination as needed.

Filling materials other than synthetic calcium carbonate used in the curable resin composition of the present invention include inorganic and organic filling materials. The inorganic filling materials include heavy calcium carbonate, calcium-magnesium carbonate (natural product, synthetic product), basic magnesium carbonate, quartz powder, silica, silicic acid fine powder (dry product, wet product, gel product), finely divided calcium silicate, finely divided aluminum silicate, kaolin clay, pyrophylite clay, talc, sericite, mica, bentonite, nepheline syenite, aluminum hydroxide, magnesium hydroxide, barium sulfate, carbon black (furnace, thermal, acetylene), graphite, and in the case of the needle and fiber forms, sepiolite, wollastonite, xonotlite, potassium titanate, carbon fiber, mineral fiber, glass fiber, and in the case of the balloon and beads forms, shirasu balloon, flyash balloon, glass balloon, silica beads, alumina beads, glass beads, and the like. The organic filling materials include acrylonitrile-series and vinylidene chloride-series resin balloon, wood powder, walnut powder, cork powder, wheat flour, starch, ebonite powder, rubber powder, lignin, phenol resin, high styrene resin, polyethylene resin, and in the case of the fiber form, cellulose powder, pulp powder, synthetic fiber powder and the like. These are used alone or two or more of these are used in combination as needed.

However, in order to obtain the effect from the curable resin composition of the present invention, the assumption is that the synthetic calcium carbonate filler of the present invention is mainly used as a filling material, and the above-described filling materials, or synthetic calcium carbonate surface-treated using a general fatty acid or a metal salt such as fatty acid sodium or potassium can be used in combination without decreasing the performance of curable resin composition of the present invention.

Other additives used in the curable resin composition of the present invention include curing catalysts, solvents to adjust viscosity and other physical properties, and waxes such as amide wax and castor oil wax.

The curing catalysts include organometallic catalysts, amine compounds, boron compounds and the like. Examples of organometallic catalysts include, as organic tin compounds, dibutyl tin laurate, dibutyl tin dilaurate, dibutyl tin dioctoate, dibutyl tin acetate, dioctyl tin stearate, dioctyl tin laurate, dioctyl tin diversatate, dibutyl tin bistriethoxysilicate, dibutyl tin bisisononyl.3-mercaptopropionate, dibutyl tin bisacetylacetonate, dibutyl tin bis(O-phenylphenoxide), dibutyl tin bisisooctylthioglycolate, dibutyl tin oxide, dioctyl tin oxide and the like. These are used alone or two or more of these are used in combination as needed. Metal catalysts other than organic tin catalysts have much lower catalytic activity than that of organic tin catalysts, however, organometallic catalysts which do not correspond to environmental limitation such as toxicity can be used. Examples thereof are titanium chelate catalysts such as titanium tetramethoxide, titanium tetraethoxide, titanium acryloxide, titanium n-propoxide, titanium tetraisopropoxide, titanium ethylacetonate and titanium acetylacetonate, organic aluminum catalysts such as aluminum trisacetylacetonate, aluminum trisethylacetoacetate and diisopropoxy aluminum ethylacetoacetate, bismuth catalysts such as bismuth tris (neodecanoate), zirconium catalysts such as zirconium tetraacetylacetonate, and the like. These are used alone or two or more of these are used in combination as needed.

The amine compounds are preferably silane compounds containing an amino group, and examples thereof include 3-aminopropyltrimethoxysilane, 3-aminopropylmethyldimethoxysilane, 3-aminopropyltriethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N,N'-bis-[3-(trimethoxysilyl)propyl]ethylenediamine, N,N'-bis-[3-(triethoxysilyl)propyl]ethylenediamine, N,N'-bis-[3-(methyldimethoxysilyl)propyl]ethylenediamine, N,N'-bis-[3-(trimethoxysilyl)propyl]hexamethylenediamine, N,N'-bis-[3-(triethoxysilyl)propyl]hexamethylenediamine, N,N'-bis-[3-(methyldimethoxysilyl)propyl]hexamethylenediamine, N,N-bis-[3-(trimethoxysilyl)propyl]ethylenediamine, N,N-bis-[3-(methyldimethoxysilyl)propyl]ethylenediamine, N,N-bis-[3-(triethoxysilyl)propyl]ethylenediamine, N,N-bis-[3-(trimethoxysilyl)propyl]hexamethylenediamine, N,N-bis-[3-(methyldimethoxysilyl)propyl]hexamethylenediamine, N,N-bis-[3-(triethoxysilyl)propyl]hexamethylenediamine, N,N-bis-[3-(trimethoxysilyl)propyl]amine, N,N-bis-[3-(triethoxysilyl)propyl]amine, N,N-bis-[3-(methyldimethoxysilyl)propyl]amine and the like, and these are used alone or two or more of these are used in combination.

The boron compounds are boron trifluoride and compounds comprising a complex thereof and the like, and specific examples thereof include an amine complex, an alcohol complex, an ether complex, a thiol complex, a sulfide complex, a carboxylic acid complex and a water complex of boron trifluoride and the like. These are used alone or two or more of these are used in combination as needed. Among the above-described complexes of boron trifluoride, an amine complex having both stability and catalytic activity is particularly preferred.

The solvents are aromatic hydrocarbons such as toluene and xylene, aliphatic hydrocarbons such as hexane and butane, petroleum solvents such as gasoline, ketones such as acetone and methyl ethyl ketone, ether esters such as cellosolve acetate and the like, and further, additives such as silicone oil and fatty acid ester modified silicone oil, and furthermore one or two or more of various additives, coloring agents, etc. can be added in combination as needed. The surface-treated calcium carbonate filler of the present invention can be used in combination with a filler which has been conventionally used within the acceptable range of performance.

The amount of surface-treated calcium carbonate filler of the present invention blended with a resin varies depending on the types and uses of resin and thus it is not always easy to prescribe, and it is suitable that the amount is commonly 5 to 200 parts, preferably about 20 to 150 parts with respect to 100 parts of resin. When the surface-treated calcium carbonate filler is less than 5 parts, sufficient thixotropic properties cannot be imparted, and when it is over 200 parts, viscosity becomes too high, and there is a tendency that working properties become worse. The amount of plasticizer blended is appropriately selected and is not particularly limited, and is generally 80 to 150 parts with respect to 100 parts of resin.

When blended with a sealant and an adhesive, the surface-treated calcium carbonate filler of the present invention can provide a curable resin composition having performance with excellent heat resistance, color fastness, strength and elongation over a long period of time.

In the case of polyurethane resin sealants and adhesives, for example, polyisocyanate urethane prepolymer having an isocyanate group at the end of the molecule can be synthesized by the reaction of a polyol and an excess of a polyisocyanate compound. As the polyol, various polyether polyols, polyester polyols, and other polyols can be used.

The polyether polyols include individual compounds such as polyoxyethylene polyol, polyoxypropylene polyol, polyoxyethylene-propylene co-polymer polyol and polytetramethylene polyol or mixtures thereof.

The polyester polyols include individual compounds of polyols obtained by polycondensation of a dicarboxylic acid (adipic acid, succinic acid, maleic acid, phthalic acid, etc.) and a glycol (ethylene glycol, propylene glycol, 1,4-butylene glycol, 1,6-hexane glycol, neopentyl glycol, etc.), for example, polyols such as polyethylene adipate, polybutylene adipate, polyhexamethylene adipate, polypropylene adipate and polyethylene-propylene adipate, and also polylactone polyols such as polycaprolactone polyol, or mixtures thereof, and polycarbonate polyol and the like.

Examples of the polyisocyanate compound used in the present invention include aromatic polyisocyanates such as 2,4-tolylene diisocyanate, 2,6-tolylene diisocyanate, 4,4-diphenylmethane diisocyanate, polymethylene polyphenylene polyisocyanate, carbodiimide modified MDI and naphthalene diisocyanate, hexamethylene diisocyanate, isophorone diisocyanate, 4,4-dicyclohexylmethane diisocyanate and alicyclic polyisocyanates. The above-described polyisocyanates can be used alone or as mixtures thereof.

The curing catalysts include known catalysts such as tin(II)oleate, tin(II)laurate, tin(II)acetate, zinc octylate, lead octylate, tin octylate, lead naphthenate, manganese naphthenate, cobalt manganate, iron(III)chloride, tin(IV)chloride, tin(II)chloride, antimony trichloride, trimethylamine, N-methylmorpholine, triethanolamine, triethylenediamine and acetylacetone, and these are used alone or two or more of these are used in combination. Among these, lead octylate, tin octylate, lead naphthenate and tin naphthenate are preferred in terms of costs. The amount of catalyst blended is preferably 0.1 to 1 part with respect to 100 parts of urethane prepolymer.

It is suitable that the amount of surface-treated calcium carbonate used in the present invention is commonly 10 to 200 parts, preferably about 20 to 150 parts with respect to 100 parts of resin. When the amount of surface-treated calcium carbonate blended is less than 10 parts, the effects of thixotropic properties and slump resistance are not expected. On the other hand, when the amount is over 200 parts, storage stability adhesion properties and the like can become worse.

Solvents, plasticizers, fillers, pigments, thickening agents (or thixotropy imparting agents), stabilizers or other additives can be blended with the present invention as needed.

The solvents include aromatic hydrocarbons such as xylene and toluene, mineral spirit, methyl ethyl ketone and the like. The amount of solvent blended is preferably 3 to 20 parts with respect to 100 parts of urethane prepolymer.

Examples of plasticizers include monomer plasticizers such as dioctyl adipate (DOA), dioctyl phthalate (DOP), dibutyl phthalate (DBP) and tricresyl phosphate (TCP), and oligomer plasticizers such as polyester, urethanated polyester, and urethanated polyether. The amount of plasticizer blended is preferably 5 to 30 parts with respect to 100 parts of urethane prepolymer.

The fillers include calcium carbonate, talc, clay, carbon, shirasu balloon, glass balloon, finely divided polyvinyl chloride and the like.

The thixotropy imparting agents include colloidal silica, finely divided carbon black, fatty acid amide, metal soaps of fatty acids and the like.

In the case of polysulfide resin sealants and adhesives, for example, liquid polysulfide polymer, which has a reactive mercaptan group (—SH) at the end of the molecule, has the backbone part of polymer represented by the general formula (3), or (3) and (4), and has fluidity at room temperature, can be used.

—(—R1-SX-)n-R1-SX　　(3)

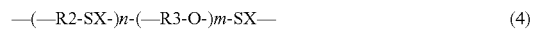

—(—R2-SX-)n-(—R3-O-)m-SX—　　(4)

[x is an integer from 1 to 5, and n, m represent an integer from 2 to 200. R1, R2 and R3 represent a divalent organic group (an alkylene group, an alkylene ether group, a hydroxy alkylene group, etc.)]

Such polysulfide polymer has fluidity at room temperature, and the number average molecular weight (Mn) is commonly 100 to 200000, preferably 800 to 50000. Preferred examples of such polysulfide polymer are described in U.S. Pat. No. 2,466,963 and Japanese Unexamined Patent Publication No. H4-363325.

A compound containing 2 or more isocyanate groups in a molecule used in a curing agent (hereinafter, simply referred to as an isocyanate group-containing compound) is preferably urethane prepolymer obtained by the reaction of an organic polyisocyanate compound and/or an active hydrogen-containing compound with an organic polyisocyanate compound.

The above-described organic polyisocyanate compounds specifically include tolylene diisocyanate, diphenylmethane diisocyanate, polymethylene polyphenyl isocyanate (crude MDI), xylylene di isocyanate, isophorone diisocyanate, hexamethylene diisocyanate and the like.

The active hydrogen-containing compounds include hydroxy-terminated polyester, polyvalent polyalkylene ether, hydroxy-terminated polyurethane polymer and mixtures thereof.

As the above-described urethane prepolymer, one obtained by the reaction of the above active hydrogen-containing compound and organic polyisocyanate compound under the condition that the isocyanate compound is excessive can be used.

In the present invention, blending is preferably carried out so that the mole ratio of isocyanate group in the isocyanate group-containing compound and thiol group in the thiol group-containing compound (isocyanate group/thiol group) will be 0.5 to 4.0, and more preferably 0.7 to 3.0. When the mole ratio is less than 0.5, a composition does not have a sufficiently high molecular weight. On the other hand, a mole ratio of over 4.0 is not preferred because a cured substance tends to be hard and fragile.

As the curing catalyst, a tertiary amine and/or an organometallic compound is used. The tertiary amines are monoamines, diamines, triamines, polyamines, cyclic amines, alcohol amines, ether amines and the like, and specific examples thereof include triethylamine, N,N-dimethylcyclohexylamine, N,N,N',N'-tetramethylethylenediamine, N,N,N',N'-tetramethylpropane-1,3-diamine, tetramethylguanidine, N,N-dipolyoxyethylene stearylamine, N,N-dipolyoxyethylene tallow alkylamine and triethylenediamine. These tertiary amines are used alone or two or more tertiary amines are used in combination as needed.

The organometallic compounds are organic tin compounds, organomercury compounds, organolead compounds and the like, and specifically include tin octylate, dibutyl tin diacetate, dibutyl tin dilaurate, dibutyl tin mercaptide, dibutyl tin maleate, dioctyl tin mercaptide, phenylmercuric propionate, lead octenoate and the like. These are used alone or two or more of these are used in combination as needed. Among these, an organic tin compound is preferred because an influence on discoloration and the like is less.

The amount of curing catalyst contained in a curable resin composition is preferably 0.001 to 5 parts, more preferably 0.005 to 3 parts with respect to 100 parts of the above polysulfide polymer. When the amount is less than 0.001 parts, curing does not proceed. An amount of over 5 parts is not preferred because there is a tendency that working life is shortened.

Other additives can be contained in the curable resin composition of the present invention as needed. As the additives, for example, other inorganic filling materials, plasticizers, pigments, rubber vulcanizing agents, reinforcing agents, adhesion-imparting agents, ultraviolet inhibitors and antiozonants, and analogues thereof can be used. As other inorganic filling materials, for example, calcium carbonate powder (precipitated), heavy calcium carbonate powder, quartz powder, alumina, calcium oxide, talc, glass powder, various aggregates and the like can be used.

EXAMPLES

The present invention will be described in more detail by way of Examples and Comparative Examples thereof. It should be noted, however, that the present invention is not limited thereto. Unless otherwise specified, % and parts are by weight in the following description.

Example 1

Using calcium carbonate synthesized using compact limestone (Mg component 800 ppm, Fe component 80 ppm) as a material, to 10 L of a water slurry of synthetic calcium carbonate having a BET specific surface area of 17 m$^2$/g, which was adjusted to a concentration of 160 g CaCO$_3$/T. and a temperature of 50° C., a surface treatment agent prepared from 6.4 g of sodium laurate (alkyl composition: C12: 100%, the same applies hereinafter) and 44.8 g of hydrogenated palm fatty acid sodium salt (alkyl composition: C16: 56%, C18: 44%, the same applies hereinafter) in 1 L of 80° C. hot water was added, and strongly stirred with the slurry of calcium carbonate. This slurry of calcium carbonate was dehydrated until the solid content became 60%, and dried in a box-type dryer at 110° C. for 12 hours and then crushed to obtain surface-treated calcium carbonate powder with a BET specific surface area of 15 m$^2$/g.

The BET specific surface area Sw, loss on heating Tg, and amount of surface treatment agent per unit specific surface area (treated rate) As of the powder, and the proportion of saturated fatty acid in the surface treatment agent SFa, the proportion of unsaturated fatty acid UFa, the magnesium component Mg and the iron component Fe among metal components contained in a surface-treated calcium carbonate filler, were shown in Table 1. Examples 2 to 23 described below were similarly shown in Table 1.

Example 2

The same operations as in Example 1 were repeated except that the material in Example 1 was changed to calcium carbonate synthesized using compact limestone (Mg component 1500 ppm, Fe component 120 ppm).

Example 3

The same operations as in Example 1 were repeated except that the material in Example 1 was changed to calcium carbonate synthesized using compact limestone (Mg component 1500 ppm, Fe component 180 ppm).

Example 4

The same operations as in Example 1 were repeated except that 3.2 g of sodium oleate (alkyl composition: C18F1: 100%, the same applies hereinafter) was added as a surface treatment agent.

Example 5

The same operations as in Example 2 were repeated except that 3.2 g of sodium oleate was added as a surface treatment agent.

Example 6

The same operations as in Example 3 were repeated except that 3.2 g of sodium oleate was added as a surface treatment agent.

Example 7

The same operations as in Example 4 were repeated except that the surface treatment agent in Example 4 was changed to 44.8 q of sodium laurate and 6.4 g of hydrogenated palm fatty acid sodium salt.

Example 8

The same operations as in Example 5 were repeated except that the surface treatment agent in Example 5 was changed to 44.8 g of sodium laurate and 6.4 g of hydrogenated palm fatty acid sodium salt.

Example 9

The same operations as in Example 6 were repeated except that the surface treatment agent in Example 6 was changed to 44.8 g of sodium laurate and 6.4 g of hydrogenated palm fatty acid sodium salt.

Example 10

The same operations as in Example 4 were repeated except that the surface treatment agent in Example 4 was changed to 19.2 g of sodium oleate.

Example 11

The same operations as in Example 5 were repeated except that the surface treatment agent in Example 5 was changed to 19.2 g of sodium oleate.

Example 12

The same operations as in Example 6 were repeated except that the surface treatment agent in Example 6 was changed to 19.2 g of sodium oleate.

Example 13

Using calcium carbonate synthesized using compact limestone (Mg component 1500 ppm, Fe component 120 ppm) as a material, to 10 L of a water slurry of synthetic calcium carbonate having a BET specific surface area of 4 $m^2/g$, which was adjusted to a concentration of 160 g $CaCO_3/L$ and a temperature of 50° C., a surface treatment agent prepared from 4.8 g of sodium laurate, 27.2 g of hydrogenated palm fatty acid sodium salt and 4.8 g of sodium oleate in 1 L of 80° C. hot water was added, and strongly stirred with the slurry of calcium carbonate. This slurry of calcium carbonate was dehydrated until the solid content became 60%, and dried in a box-type dryer at 110° C. for 12 hours and then crushed to obtain surface-treated calcium carbonate powder with a BET specific surface area of 3 $m^2/g$.

Example 14

The same opera ions as in Example 13 were repeated except that the BET specific surface area of a synthetic calcium carbonate water slurry was changed to 7 $m^2/g$ and the BET specific surface area of the obtained surface-treated calcium carbonate powder was changed to 6 $m^2/g$.

Example 15

The same operations as in Example 13 were repeated except that the BET specific surface area of a synthetic calcium carbonate water slurry was changed to 12 $m^2/g$ and the BET specific surface area of the obtained surface-treated calcium carbonate powder was changed to 10 $m^2/g$.

Example 16

The same operations as in Example 13 were repeated except that the BET specific surface area of a synthetic calcium carbonate water slurry was changed to 17 $m^2/g$ and the BET specific surface area of the obtained surface-treated calcium carbonate powder was changed to 15 $m^2/g$.

Example 17

The same operations as in Example 16 were repeated except that the surface treatment agent in Example 16 was changed to 7.2 g of sodium laurate, 40.8 g of hydrogenated palm fatty acid sodium and 7.2 g of sodium oleate.

Example 18

The same operations as in Example 16 were repeated except that the surface treatment agent in Example 16 was changed to 8.8 g of sodium laurate, 49.9 g of hydrogenated palm fatty acid sodium, and 8.8 g of sodium oleate.

Example 19

The same operations as in Example 16 were repeated except that the surface treatment agent in Example 16 was changed to 11.2 g of sodium laurate, 63.5 g of hydrogenated palm fatty acid sodium, and 11.2 g of sodium oleate.

Example 20

The same operations as in Example 16 were repeated except that the surface treatment agent in Example 16 was changed to 16.8 g of sodium laurate, 95.2 g of hydrogenated palm fatty acid sodium, and 16.8 g of sodium oleate.

Example 21

The same operations as in Example 20 were repeated except that the BET specific surface area of a synthetic calcium carbonate water slurry was changed to 23 $m^2/g$, and the BET specific surface area of the obtained surface-treated calcium carbonate powder was changed to 20 $m^2/g$.

Example 22

The same operations as in Example 20 were repeated except that the BET specific surface area of a synthetic calcium carbonate water slurry was changed to 42 $m^2/g$, and the BET specific surface area of the obtained surface-treated calcium carbonate powder was changed to 37 $m^2/g$.

Example 23

The same operations as in Example 20 were repeated except that the BET specific surface area of a synthetic calcium carbonate water slurry was changed to 55 $m^2/g$, and the BET specific surface area of the obtained surface-treated calcium carbonate powder was changed to 45 $m^2/g$.

TABLE 1

| | Surface treatment agenat | Amount of surface treatment agent (%) | Sw ($m^2/g$) | Tg (mg/g) | As (mg/$m^2$) | Alkyl composition (%) | | | | SFa (%) | UFa (%) | Mg (ppm) | Fe (ppm) |
|---|---|---|---|---|---|---|---|---|---|---|---|---|---|
| | | | | | | C12 | C16 | C18 | C18F1 | | | | |
| Example 1 | sodium laurate | 0.4 | 15 | 28.59 | 1.91 | 12.5 | 49.0 | 38.5 | 0.0 | 100 | 0 | 798 | 78 |
| Example 2 | hydrogenated palm fatty acid sodium salt | 2.8 | 15 | 28.50 | 1.90 | 12.3 | 48.5 | 39.2 | 0.0 | 100 | 0 | 1512 | 117 |
| Example 3 | | | 15 | 28.62 | 1.91 | 12.4 | 49.1 | 38.5 | 0.0 | 100 | 0 | 1498 | 183 |
| Example 4 | sodium laurate | 0.4 | 15 | 30.33 | 2.02 | 11.8 | 46.1 | 36.2 | 5.9 | 94.1 | 5.9 | 807 | 83 |

TABLE 1-continued

| | Surface treatment agenat | Amount of surface treatment agent (%) | Sw (m²/g) | Tg (mg/g) | As (mg/m²) | Alkyl composition (%) | | | | SFa (%) | UFa (%) | Mg (ppm) | Fe (ppm) |
|---|---|---|---|---|---|---|---|---|---|---|---|---|---|
| | | | | | | C12 | C16 | C18 | C18F1 | | | | |
| Example 5 | hydrogenated palm fatty acid sodium salt | 2.8 | 15 | 30.65 | 2.04 | 11.5 | 45.1 | 37.2 | 6.2 | 93.8 | 6.2 | 1479 | 125 |
| Example 6 | sodium oleate | 0.2 | 15 | 30.47 | 2.03 | 12.0 | 46.8 | 36.4 | 4.8 | 95.2 | 4.8 | 1499 | 176 |
| Example 7 | sodium laurate | 2.8 | 15 | 29.80 | 1.99 | 82.3 | 6.6 | 5.2 | 5.9 | 94.1 | 5.9 | 809 | 85 |
| Example 8 | hydrogenated palm fatty acid sodium salt | 0.4 | 15 | 29.75 | 1.98 | 80.9 | 6.8 | 5.5 | 6.8 | 93.2 | 6.8 | 1520 | 112 |
| Example 9 | sodium oleate | 0.2 | 15 | 29.64 | 1.98 | 81.5 | 6.3 | 6.0 | 6.2 | 93.8 | 6.2 | 1501 | 188 |
| Example 10 | sodium laurate | 0.4 | 15 | 38.93 | 2.60 | 9.1 | 35.6 | 28.0 | 27.3 | 72.7 | 27.3 | 789 | 76 |
| Example 11 | hydrogenated palm fatty acid sodium salt | 2.8 | 15 | 39.02 | 2.60 | 9.8 | 35.9 | 28.6 | 25.7 | 74.3 | 25.7 | 1486 | 123 |
| Example 12 | sodium oleate | 1.2 | 15 | 38.59 | 2.57 | 9.5 | 35.4 | 27.7 | 27.4 | 72.6 | 27.4 | 1497 | 184 |
| Example 13 | sodium laurate hydrogenated palm fatty acid sodium salt sodium oleate | 0.3 1.7 0.3 | 3 | 20.77 | 6.92 | 13.0 | 41.4 | 32.6 | 13.0 | 87.0 | 13.0 | 1488 | 119 |
| Example 14 | sodium laurate hydrogenated palm fatty acid sodium salt sodium oleate | 0.3 1.7 0.3 | 6 | 20.58 | 3.43 | 12.9 | 39.8 | 33.7 | 13.6 | 86.4 | 13.6 | 1491 | 123 |
| Example 15 | sodium laurate hydrogenated palm fatty acid sodium salt sodium oleate | 0.3 1.7 0.3 | 10 | 20.64 | 2.06 | 13.3 | 40.9 | 31.8 | 14.0 | 86.0 | 14.0 | 1506 | 130 |
| Example 16 | sodium laurate hydrogenated palm fatty acid sodium salt sodium oleate | 0.3 1.7 0.3 | 15 | 20.81 | 1.39 | 13.1 | 42.0 | 33.4 | 11.5 | 88.5 | 11.5 | 1482 | 119 |
| Example 17 | sodium laurate hydrogenated palm fatty acid sodium salt sodium oleate | 0.45 2.55 0.45 | 15 | 30.80 | 2.05 | 13.1 | 40.8 | 31.8 | 14.3 | 85.7 | 14.3 | 1524 | 124 |
| Example 18 | sodium laurate hydrogenated palm fatty acid sodium salt sodium oleate | 0.55 3.12 0.55 | 15 | 37.40 | 2.49 | 13.6 | 39.2 | 31.5 | 15.7 | 84.3 | 15.7 | 1519 | 116 |
| Example 19 | sodium laurate hydrogenated palm fatty acid sodium salt sodium oleate | 0.7 3.97 0.7 | 15 | 47.07 | 3.13 | 12.8 | 41.9 | 33.3 | 12.0 | 88.0 | 12.0 | 1499 | 120 |
| Example 20 | sodium laurate hydrogenated palm fatty acid sodium salt sodium oleate | 1.05 5.95 1.05 | 15 | 68.81 | 4.58 | 13.4 | 38.8 | 33.6 | 14.2 | 85.8 | 14.2 | 1505 | 122 |
| Example 21 | sodium laurate hydrogenated palm fatty acid sodium salt sodium oleate | 1.05 5.95 1.05 | 20 | 68.92 | 3.45 | 13.3 | 40.6 | 33.1 | 13.0 | 87.0 | 13.0 | 1487 | 116 |
| Example 22 | sodium laurate hydrogenated palm fatty acid sodium salt sodium oleate | 1.05 5.95 1.05 | 37 | 70.30 | 1.90 | 13.0 | 40.7 | 32.5 | 13.8 | 86.2 | 13.8 | 1524 | 122 |
| Example 23 | sodium laurate hydrogenated palm fatty acid sodium salt sodium oleate | 1.05 5.95 1.05 | 45 | 68.88 | 1.53 | 13.2 | 41.1 | 31.9 | 13.8 | 86.2 | 13.8 | 1491 | 120 |

Comparative Example 1

The same operations as in Example 4 were repeated except that the material in Example 4 was changed to calcium carbonate synthesized using compact limestone (Mg component 1500 ppm, Fe component 280 ppm). The surface treatment agent, the amount of surface treatment, and the Sw, Tg, As, SFa, UFa, Mg and Fe of the obtained powder were shown in Table 2. Comparative Examples 2 to 12 described below were similarly shown in Table 2.

Comparative Example 2

The same operations as in Example 4 were repeated except that the material in Example 4 was changed to calcium carbonate synthesized using compact limestone (Mg component 2200 ppm, Fe component 120 ppm).

Comparative Example 3

The same operations as in Example 4 were repeated except that the material in Example 4 was changed to calcium carbonate synthesized using compact limestone (Mg component 2200 ppm, Fe component 280 ppm).

Comparative Example 4

The same operations as in Example 7 were repeated except that the material in Example 7 was changed to calcium carbonate synthesized using compact limestone (Mg component 1500 ppm, Fe component 280 ppm).

Comparative Example 5

The same operations as in Example 7 were repeated except that the material in Example 7 was changed to calcium carbonate synthesized using compact limestone (Mg component 2200 ppm, Fe component 120 ppm).

Comparative Example 6

The same operations as in Example 7 were repeated except that the material in Example 7 was changed to calcium carbonate synthesized using compact limestone (Mg component 2200 ppm, Fe component 280 ppm).

Comparative Example 7

The same operations as in Example 10 were repeated except that the material in Example 10 was changed to calcium carbonate synthesized using compact limestone (Mg component 1500 ppm, Fe component 280 ppm).

Comparative Example 8

The same operations as in Example 10 were repeated except that the material in Example 10 was changed to calcium carbonate synthesized using compact limestone (Mg component 2200 ppm, Fe component 120 ppm).

Comparative Example 9

The same operations as in Example 10 were repeated except that the material in Example 10 was changed to calcium carbonate synthesized using compact limestone (Mg component 2200 ppm, Fe component 280 ppm).

Comparative Example 10

The same operations as in Example 4 were repeated except that the surface treatment agent in Example 4 was changed to 32 g of sodium oleate.

Comparative Example 11

The same operations as in Example 5 were repeated except that the surface treatment agent in Example 5 was changed to 32 g of sodium oleate.

Comparative Example 12

The same operations as in Example 6 were repeated except that the surface treatment agent in Example 6 was changed to 32 g of sodium oleate.

TABLE 2

| | Surface treatment agenat | Amount of surface treatment agent (%) | Sw (m$^2$/g) | Tg (mg/g) | As (mg/m$^2$) | Alkyl composition (%) | | | | SFa (%) | UFa (%) | Mg (ppm) | Fe (ppm) |
| --- | --- | --- | --- | --- | --- | --- | --- | --- | --- | --- | --- | --- | --- |
| | | | | | | C12 | C16 | C18 | C18F1 | | | | |
| Comp. Ex. 1 | sodium laurate | 0.4 | 15 | 30.33 | 2.02 | 11.8 | 46.1 | 36.2 | 5.9 | 94.1 | 5.9 | 1486 | 295 |
| Comp. Ex. 2 | hydrogenated palm fatty acid sodium salt | 2.8 | 15 | 30.16 | 2.01 | 11.3 | 45.8 | 35.8 | 7.1 | 92.9 | 7.1 | 2230 | 132 |
| Comp. Ex. 3 | sodium oleate | 0.2 | 15 | 29.88 | 1.99 | 11.4 | 46.8 | 36.0 | 5.8 | 94.2 | 5.8 | 2196 | 284 |
| Comp. Ex. 4 | sodium laurate | 2.8 | 15 | 29.80 | 1.99 | 82.3 | 6.6 | 5.2 | 5.9 | 94.1 | 5.9 | 1503 | 276 |
| Comp. Ex. 5 | hydrogenated palm fatty acid sodium salt | 0.4 | 15 | 29.80 | 1.99 | 83.2 | 6.6 | 5.0 | 5.2 | 94.8 | 5.2 | 2200 | 116 |
| Comp. Ex. 6 | sodium oleate | 0.2 | 15 | 29.67 | 1.98 | 81.9 | 6.9 | 4.8 | 6.4 | 93.6 | 6.4 | 2185 | 289 |
| Comp. Ex. 7 | sodium laurate | 0.4 | 15 | 38.93 | 2.60 | 9.1 | 35.6 | 28.0 | 27.3 | 72.7 | 27.3 | 1489 | 275 |
| Comp. Ex. 8 | hydrogenated palm fatty acid sodium salt | 2.8 | 15 | 38.72 | 2.58 | 10.0 | 34.8 | 28.7 | 26.5 | 73.5 | 26.5 | 2234 | 115 |
| Comp. Ex. 9 | sodium oleate | 1.2 | 15 | 38.84 | 2.59 | 9.4 | 35.7 | 27.6 | 27.3 | 72.7 | 27.3 | 2186 | 278 |
| Comp. Ex. 10 | sodium laurate | 0.4 | 15 | 45.68 | 3.05 | 7.7 | 30.1 | 23.7 | 38.5 | 61.5 | 38.5 | 812 | 76 |
| Comp. Ex. 11 | hydrogenated palm fatty acid sodium salt | 2.8 | 15 | 45.06 | 3.00 | 7.1 | 30.5 | 22.9 | 39.5 | 60.5 | 39.5 | 1482 | 119 |
| Comp. Ex. 12 | sodium oleate | 2.0 | 15 | 45.34 | 3.02 | 7.7 | 29.9 | 23.5 | 38.9 | 61.1 | 38.9 | 1516 | 186 |

Examples 24 to 46, Comparative Examples 13 to 24

Using the surface-treated calcium carbonate fillers obtained in Examples 1 to 23 and Comparative Examples 1 to 12, one component type modified silicone sealants were produced by the following composition and kneading method and evaluated by the following method. The results are shown in Table 3 and Table 4.

To confirm an influence on the hues of a cured substance, titanium oxide, an antioxidant and an ultraviolet absorber were not added.

(Test Method for One Component Type Modified Silicone Sealant)
[Composition]

Modified silicone resin (MS Polymer S203 manufactured by KANEKA CORPORATION) 150 parts -continued

| | |
|---|---|
| Modified silicone resin (MS Polymer S303 manufactured by KANEKA CORPORATION) | 150 parts |
| Plasticizer DINP (manufactured by J-PLUS Co., Ltd.) | 180 parts |
| Heavy calcium carbonate (SUPER S manufactured by MARUO CALCIUM CO., LTD.) | 90 parts |
| Surface-treated calcium carbonate filler | 420 parts |
| Dehydrating agent KBM-1003 (manufactured by Shin-Etsu Chemical Co., Ltd.) | 18 parts |
| Tin catalyst NEOSTANN U-220H (manufactured by Nitto Kasei Co., Ltd.) | 6 parts |
| Aminosilane KBM-603 (manufactured by Shin-Etsu Chemical Co., Ltd.) | 6 parts |
| Total | 1020 parts |

[Kneading Method]

Into a 5 L universal mixer (manufactured by DALTON CORPORATION), the modified silicone resins were put, and a surface-treated calcium carbonate filler dried at 105° C.×2 hours or more in advance and heavy calcium carbonate were also put therein, and the obtained mixture was preliminarily stirred at a low speed for 15 minutes. After that, the filler attached to the inside of the mixer was scraped, immediately followed by kneading under a vacuum atmosphere at a high speed for 30 minutes. Subsequently, the dehydrating agent, the tin catalyst and aminosilane were put therein, and the obtained mixture was mixed under a vacuum atmosphere at a low speed for 15 minutes. This was filled in a cartridge coated with aluminum foil lamination, which was stoppered tightly with a metal plunger to produce a one component type modified silicone sealant.

[Method for Testing Hue of Cured Substance]

The sealant left to stand at 23° C. for a day was filled in a PP container with a diameter of 50 mm and a depth of 10 mm by a cartridge gun, and struck with a spatula. The hue (L, a, b) on the surface of the cured substance after 23° C.×14 days+30° C.×14 days was used as an initial hue, and furthermore the hue (L, a, b) on the surface of the cured substance after 80° C.×28 days was used as the hue after heating. The hue was measured using a standard plate A-2045 by a color difference meter (ZE2000 manufactured by NTPPON DENSHOKU INDUSTRIES CO., LTD.) It should be noted that a higher value of the hue L is better and a lower value of the hues a, b each is better.

[Method for Tensile Test]

On the surface of an aluminum plate (50 mm×50 mm×3 mm), a primer (No. 40 manufactured by The Yokohama Rubber Co., Ltd) was applied, and dried for 60 minutes, and the above-described sealant was then filled therein (a shape with 12 mm×12 mm×50 mm), and an H-shaped test piece was produced in accordance with production of tensile test piece in 5. 17. 2 durability in JIS A 1439 sealants for sealing and glazing in buildings.

This H-shaped test piece was cured at 23° C.×14 days+30° C.×14 days, and the maximum strength (Tmax) and the maximum elongation rate (Emax) measured after 23° C.×1 day using a tensile tester (Autograph AG-1 manufactured by SHIMADZU CORPORATION) were used as the initial strength and initial elongation, respectively. Furthermore, the test piece was cured at 80° C.×28 days, and the maximum strength (Tmax) and the maximum elongation rate (Emax) measured after 23° C.×14 days were used as the strength after heating and the elongation after heating, respectively.

Maximum strength (Tmax): a value obtained by dividing the largest load when drawing a test piece at a speed of 50 mm per minute by the sectional area of a sealant (600 mm$^2$), and a higher value is better.

Maximum elongation rate (Emax): a value obtained by dividing the displacement when measuring the maximum strength by a shape at the time of filling (12 mm), and increasing the obtained value a hundred-fold, and a higher value is better.

From Table 3 and Table 4, it is found that one component type modified silicon sealants typified by Examples 24 to 46 blended with the surface-treated calcium carbonate fillers in Examples 1 to 23 have excellent heat resistance and color fastness.

TABLE 3

| Examples | | | 24 | 25 | 26 | 27 | 28 | 29 | 30 | 31 | 32 | 33 | 34 | 35 |
|---|---|---|---|---|---|---|---|---|---|---|---|---|---|---|
| Number of example of filler used | | | 1 | 2 | 3 | 4 | 5 | 6 | 7 | 8 | 9 | 10 | 11 | 12 |
| Proportion of saturated fatty acid | SFa | (%) | 100 | 100 | 100 | 94.1 | 93.8 | 95.2 | 94.1 | 93.2 | 93.8 | 72.7 | 74.3 | 72.6 |
| Proportion of unsaturated fatty acid | UFa | (%) | 0 | 0 | 0 | 5.9 | 6.2 | 4.8 | 5.9 | 6.8 | 6.2 | 27.3 | 25.7 | 27.4 |
| Metallic components | Mg | (ppm) | 798 | 1512 | 1498 | 807 | 1479 | 1499 | 809 | 1520 | 1501 | 789 | 1486 | 1497 |
| | Fe | (ppm) | 78 | 117 | 183 | 83 | 125 | 176 | 85 | 112 | 188 | 76 | 123 | 184 |
| BET specific surface area | Sw | (m$^2$/g) | 15 | 15 | 15 | 15 | 15 | 15 | 15 | 15 | 15 | 15 | 15 | 15 |
| Treated rate | As | (mg/m$^2$) | 1.91 | 1.90 | 1.91 | 2.02 | 2.04 | 2.03 | 1.99 | 1.98 | 1.98 | 2.60 | 2.60 | 2.57 |
| Initial hue | L | (—) | 89.8 | 89.0 | 88.9 | 90.0 | 89.4 | 88.8 | 89.8 | 89.3 | 88.6 | 88.6 | 88.0 | 87.6 |
| | a | (—) | −1.2 | −0.7 | −0.7 | −1.2 | −0.5 | −0.5 | −1.2 | −0.4 | −0.4 | −1.0 | −0.4 | −0.4 |
| | b | (—) | 3.3 | 4.0 | 4.7 | 3.2 | 4.3 | 5.0 | 3.3 | 4.3 | 5.1 | 4.8 | 5.4 | 6.7 |
| Hue after heating | L | (—) | 84.9 | 83.7 | 83.1 | 85.0 | 84.0 | 83.2 | 84.9 | 84.1 | 83.0 | 82.9 | 81.8 | 80.8 |
| | a | (—) | 0.1 | 0.6 | 0.7 | 0.0 | 0.7 | 0.7 | −0.1 | 0.6 | 0.7 | 0.3 | 0.8 | 0.8 |
| | b | (—) | 6.1 | 7.1 | 8.2 | 6.0 | 7.3 | 8.3 | 6.1 | 7.4 | 8.4 | 7.6 | 8.4 | 9.9 |
| Initial strength | Tmax | (N/mm$^2$) | 0.94 | 0.95 | 0.91 | 0.98 | 0.98 | 0.89 | 1.19 | 1.18 | 1.06 | 0.86 | 0.87 | 0.82 |
| Strength after heating | Tmax | (N/mm$^2$) | 0.73 | 0.72 | 0.66 | 0.79 | 0.78 | 0.68 | 0.95 | 0.90 | 0.79 | 0.66 | 0.65 | 0.57 |

TABLE 3-continued

| | | | | | | | | | | | | |
|---|---|---|---|---|---|---|---|---|---|---|---|---|
| Initial elongation | Emax | (%) | 680 | 670 | 670 | 690 | 690 | 650 | 590 | 590 | 540 | 640 | 630 | 610 |
| Elongation after heating | Emax | (%) | 500 | 500 | 430 | 590 | 580 | 440 | 490 | 470 | 340 | 400 | 380 | 350 |

| | | | Examples | 36 | 37 | 38 | 39 | 40 | 41 | 42 | 43 | 44 | 45 | 46 |
|---|---|---|---|---|---|---|---|---|---|---|---|---|---|---|
| | Number of example of filler used | | | 13 | 14 | 15 | 16 | 17 | 18 | 19 | 20 | 21 | 22 | 23 |
| Proportion of saturated fatty acid | SFa | (%) | | 87.0 | 86.4 | 86.0 | 88.5 | 85.7 | 84.3 | 88.0 | 85.8 | 87.0 | 86.2 | 86.2 |
| Proportion of unsaturated fatty acid | UFa | (%) | | 13.0 | 13.6 | 14.0 | 11.5 | 14.3 | 15.7 | 12.0 | 14.2 | 13.0 | 13.8 | 13.8 |
| Metallic components | Mg | (ppm) | | 1488 | 1491 | 1506 | 1482 | 1524 | 1519 | 1499 | 1505 | 1487 | 1524 | 1491 |
| | Fe | (ppm) | | 119 | 123 | 130 | 119 | 124 | 116 | 120 | 122 | 116 | 122 | 120 |
| BET specific surface area | Sw | (m$^2$/g) | | 3 | 6 | 10 | 15 | 15 | 15 | 15 | 15 | 20 | 37 | 45 |
| Treated rate | As | (mg/m$^2$) | | 6.92 | 3.43 | 2.06 | 1.39 | 2.05 | 2.49 | 3.13 | 4.58 | 3.45 | 1.90 | 1.53 |
| Initial hue | L | (—) | | 88.6 | 88.6 | 89.0 | 89.8 | 89.3 | 89.2 | 89.0 | 88.9 | 88.9 | 89.9 | 89.9 |
| | a | (—) | | -0.4 | -0.5 | -0.5 | -0.6 | -0.5 | -0.4 | -0.4 | -0.4 | -0.4 | -0.6 | -0.6 |
| | b | (—) | | 5.2 | 5.1 | 4.8 | 4.5 | 4.6 | 4.8 | 4.9 | 5.0 | 4.9 | 4.6 | 4.5 |
| Hue after heating | L | (—) | | 82.8 | 82.8 | 83.6 | 84.4 | 83.8 | 83.7 | 83.4 | 83.3 | 83.4 | 84.0 | 84.1 |
| | a | (—) | | 0.8 | 0.7 | 0.7 | 0.7 | 0.6 | 0.6 | 0.6 | 0.6 | 0.6 | 0.7 | 0.6 |
| | b | (—) | | 8.4 | 8.2 | 7.7 | 7.4 | 7.5 | 7.6 | 7.8 | 8.2 | 8.0 | 7.4 | 7.4 |
| Initial strength | Tmax | (N/mm$^2$) | | 0.55 | 0.65 | 0.76 | 0.94 | 0.93 | 0.91 | 0.86 | 0.77 | 0.78 | 0.63 | 0.57 |
| Strength after heating | Tmax | (N/mm$^2$) | | 0.51 | 0.58 | 0.64 | 0.73 | 0.72 | 0.70 | 0.63 | 0.53 | 0.66 | 0.57 | 0.52 |
| Initial elongation | Emax | (%) | | 610 | 600 | 590 | 530 | 680 | 690 | 690 | 700 | 770 | 500 | 490 |
| Elongation after heating | Emax | (%) | | 330 | 400 | 500 | 360 | 540 | 560 | 550 | 480 | 690 | 410 | 330 |

L value: higher is better
a value: lower is better
b value: lower is better
Tmax: higher is better
Emax: higher is better

TABLE 4

| | Comp. Examples | | 13 | 14 | 15 | 16 | 17 | 18 | 19 | 20 | 21 | 22 | 23 | 24 |
|---|---|---|---|---|---|---|---|---|---|---|---|---|---|---|
| | Number of comp. example of filler used | | 1 | 2 | 3 | 4 | 5 | 6 | 7 | 8 | 9 | 10 | 11 | 12 |
| Proportion of saturated fatty acid | SFa | (%) | 94.1 | 92.9 | 94.2 | 94.1 | 94.8 | 93.6 | 72.7 | 73.5 | 72.7 | 61.5 | 60.5 | 61.1 |
| Proportion of unsaturated fatty acid | UFa | (%) | 5.9 | 7.1 | 5.8 | 5.9 | 5.2 | 6.4 | 27.3 | 26.5 | 27.3 | 38.5 | 39.5 | 38.9 |
| Metallic components | Mg | (ppm) | 1486 | 2230 | 2196 | 1503 | 2200 | 2185 | 1489 | 2234 | 2186 | 812 | 1482 | 1516 |
| | Fe | (ppm) | 295 | 132 | 284 | 276 | 116 | 289 | 275 | 115 | 278 | 76 | 119 | 186 |
| BET specific surface area | Sw | (m$^2$/g) | 15 | 15 | 15 | 15 | 15 | 15 | 15 | 15 | 15 | 15 | 15 | 15 |
| Treated rate | As | (mg/m$^2$) | 2.02 | 2.01 | 1.99 | 1.99 | 1.99 | 1.98 | 2.60 | 2.58 | 2.59 | 3.05 | 3.00 | 3.02 |
| Initial hue | L | (—) | 88.0 | 82.7 | 82.3 | 87.8 | 82.6 | 81.8 | 86.2 | 82.5 | 81.6 | 86.7 | 86.1 | 86.0 |
| | a | (—) | -0.1 | 1.1 | 1.4 | 0.0 | 1.1 | 1.6 | 0.2 | 1.4 | 1.8 | 0.2 | 0.6 | 0.7 |
| | b | (—) | 6.0 | 4.6 | 6.4 | 6.4 | 4.8 | 6.6 | 6.8 | 5.6 | 6.9 | 5.4 | 5.9 | 7.0 |
| Hue after heating | L | (—) | 82.1 | 77.2 | 76.5 | 81.9 | 77.1 | 76.1 | 79.0 | 76.4 | 74.3 | 80.7 | 79.3 | 78.6 |
| | a | (—) | 1.3 | 2.6 | 2.9 | 1.5 | 2.8 | 3.2 | 1.8 | 3.3 | 3.6 | 1.7 | 2.2 | 2.3 |
| | b | (—) | 10.1 | 9.6 | 11.8 | 10.4 | 9.7 | 12.0 | 11.6 | 11.2 | 13.8 | 11.2 | 12.1 | 13.5 |
| Initial strength | Tmax | (N/mm$^2$) | 0.82 | 0.85 | 0.80 | 0.95 | 1.01 | 0.97 | 0.78 | 0.81 | 0.76 | 0.78 | 0.77 | 0.73 |
| Strength after heating | Tmax | (N/mm$^2$) | 0.61 | 0.63 | 0.60 | 0.71 | 0.75 | 0.73 | 0.51 | 0.55 | 0.50 | 0.45 | 0.45 | 0.39 |

TABLE 4-continued

| Comp. Examples | | 13 | 14 | 15 | 16 | 17 | 18 | 19 | 20 | 21 | 22 | 23 | 24 |
|---|---|---|---|---|---|---|---|---|---|---|---|---|---|
| Initial elongation | Emax (%) | 640 | 650 | 630 | 540 | 540 | 530 | 570 | 590 | 550 | 580 | 600 | 550 |
| Elongation after heating | Emax (%) | 410 | 440 | 380 | 310 | 330 | 310 | 320 | 340 | 300 | 290 | 290 | 280 |

L value: higher is better
a value: lower is better
b value: lower is better
Tmax: higher is better
Emax: higher is better Examples 47 to 60, Comparative Examples 25 to 33

Using the surface-treated calcium carbonate fillers obtained in Examples 1 to 6, 10 to 12, 15, 17 to 19, 21 and Comparative Examples 1 to 3 and 7 to 12, one component type polyurethane sealants were produced by the following composition and kneading method and evaluated by the following method. The results are shown in Table 5 and Table 6.

(Test Method for One Component Type Polyurethane Sealant)
[Composition]

| | |
|---|---|
| Polyurethane resin (TAKENATE L-1036 manufactured by MITSUI TAKEDA CHEMICALS, INC.) | 300 parts |
| Plasticizer DINP (manufactured by J-PLUS Co., Ltd.) | 240 parts |
| Surface-treated calcium carbonate | 420 parts |
| Heavy calcium carbonate (SUPER-S manufactured by MARUO CALCIUM CO., LTD.) | 90 parts |
| Mineral turpen | 42 parts |
| Amine catalyst (U-CAT 651M manufactured by San-Apro Ltd.) | 1 part |
| Total | 1093 parts |

It should be noted that although the effect of imparting viscosity varies depending on the BET specific surface area of calcium carbonate as a base, the evaluation was made using the same amount of surface-treated calcium carbonate filler because adhesives have low viscosity and high viscosity types depending on uses.

[Kneading Method]

Into a 5 L universal mixer (manufactured by DALTON CORPORATION), the polyurethane resin was put, and a surface-treated calcium carbonate filler dried at 105° C.×2 hours or more in advance and heavy calcium carbonate were also put therein, and the obtained mixture was preliminarily stirred at a low speed for 15 minutes. After that, the filler attached to the inside of the mixer was scraped, immediately followed by kneading under a vacuum atmosphere at a high speed for 30 minutes. Finally, mineral turpen was put therein and the obtained mixture was mixed under a vacuum atmosphere at a low speed for 15 minutes. This was filled in a cartridge coated with aluminum foil lamination, which was stoppered tightly with a metal plunger to produce a one component type polyurethane sealant.

[Test Method for Hue of Cured Substance]

The sealant left to stand at 23° C. for a day is filled in a PP container with a diameter of 50 mm and a depth of 10 mm by a cartridge gun, and struck with a spatula. The hue (L, a, b) on the surface of the cured substance after 23° C.×14 days+30° C.×14 days was used as an initial hue, and furthermore the hue (L, a, b) on the surface of the cured substance after 80° C.×28 days was used as the hue after heating. The hue was measured using a standard plate A-2045 by a color difference meter (ZE2000 manufactured by NIPPON DENSHOKU INDUSTRIES CO., LTD.) It should be noted that a higher value of the hue L is better and a lower value of the hues a, b each is better.

[Method for Tensile Test]

On the surface of an aluminum plate (50 mm×50 mm×3 mm), a primer (No. 30 manufactured by The Yokohama Rubber Co., Ltd) was applied, and dried for 60 minutes, and the above-described sealant was then filled therein (a shape with 12 mm×12 mm×50 mm), and an H-shaped test piece was produced in accordance with production of tensile test piece in 5. 17. 2 durability in JIS A 1439 sealants for sealing and glazing in buildings.

This H-shaped test piece was cured at 23° C.×14 days+ 30° C.×14 days, and the maximum strength (Tmax) and the maximum elongation rate (Emax) measured after 23° C.×1 day using a tensile tester (Autograph AG-1 manufactured by SHIMADZU CORPORATION) were used as the initial strength and initial elongation, respectively. Furthermore, the test piece was cured at 80° C.×28 days, and the maximum strength (Tmax) and the maximum elongation rate (Emax) measured after 23° C.×14 days were used as the strength after heating and the elongation after heating, respectively.

Maximum strength (Tmax): a value obtained by dividing the largest load when drawing a test piece at a speed of 50 mm per minute by the sectional area of a sealant (600 mm$^2$), and a higher value is better.

Maximum elongation rate (Emax): a value obtained by dividing the displacement when measuring the maximum strength by a shape at the time of filling (12 mm), and increasing the obtained value a hundred-fold, and a higher value is better.

TABLE 5

| Examples | 47 | 48 | 49 | 50 | 51 | 52 | 53 | 54 |
|---|---|---|---|---|---|---|---|---|
| Number of example of filler used | 1 | 2 | 3 | 4 | 5 | 6 | 10 | 11 |
| Proportion of SFa (%) saturated fatty acid | 100 | 100 | 100 | 94.1 | 93.8 | 95.2 | 72.7 | 74.3 |

TABLE 5-continued

| | | | | | | | | | | |
|---|---|---|---|---|---|---|---|---|---|---|
| Proportion of unsaturated fatty acid | UFa | (%) | 0 | 0 | 0 | 5.9 | 6.2 | 4.8 | 27.3 | 25.7 |
| Metallic components | Mg | (ppm) | 798 | 1512 | 1498 | 807 | 1479 | 1499 | 789 | 1486 |
| | Fe | (ppm) | 78 | 117 | 183 | 83 | 125 | 176 | 76 | 123 |
| BET specific surface area | Sw | (m$^2$/g) | 15 | 15 | 15 | 15 | 15 | 15 | 15 | 15 |
| Treated rate | As | (mg/m$^2$) | 1.91 | 1.90 | 1.91 | 2.02 | 2.04 | 2.03 | 2.60 | 2.60 |
| Initial hue | L | (—) | 88.0 | 87.1 | 86.9 | 88.4 | 87.4 | 87.1 | 87.1 | 86.1 |
| | a | (—) | −1.6 | −1.3 | −1.0 | −1.5 | −1.0 | −0.8 | −1.5 | −1.1 |
| | b | (—) | 4.6 | 5.4 | 6.0 | 4.7 | 5.7 | 7.1 | 6.3 | 7.2 |
| Hue after heating | L | (—) | 82.9 | 82.1 | 81.0 | 84.1 | 81.8 | 80.9 | 81.1 | 79.8 |
| | a | (—) | 0.5 | 1.2 | 1.5 | 0.3 | 1.1 | 1.4 | 0.6 | 1.3 |
| | b | (—) | 7.8 | 8.6 | 10.0 | 7.4 | 9.2 | 10.0 | 9.0 | 10.2 |
| Initial strength | Tmax | (N/mm$^2$) | 1.18 | 1.20 | 1.11 | 1.21 | 1.16 | 1.12 | 1.09 | 1.09 |
| Strength after heating | Tmax | (N/mm$^2$) | 0.94 | 0.92 | 0.84 | 0.99 | 0.99 | 0.92 | 0.88 | 0.85 |
| Initial elongation | Emax | (%) | 590 | 590 | 570 | 600 | 610 | 580 | 550 | 530 |
| Elongation after heating | Emax | (%) | 420 | 430 | 350 | 490 | 480 | 360 | 330 | 280 |

| | | Examples | 55 | 56 | 57 | 58 | 59 | 60 |
|---|---|---|---|---|---|---|---|---|
| | | Number of example of filler used | 12 | 15 | 17 | 18 | 19 | 21 |
| Proportion of saturated fatty acid | SFa | (%) | 72.6 | 86.0 | 85.7 | 84.3 | 88.0 | 87.0 |
| Proportion of unsaturated fatty acid | UFa | (%) | 27.4 | 14.0 | 14.3 | 15.7 | 12.0 | 13.0 |
| Metallic components | Mg | (ppm) | 1497 | 1506 | 1524 | 1519 | 1499 | 1487 |
| | Fe | (ppm) | 184 | 130 | 124 | 116 | 120 | 116 |
| BET specific surface area | Sw | (m$^2$/g) | 15 | 10 | 15 | 15 | 15 | 20 |
| Treated rate | As | (mg/m$^2$) | 2.57 | 2.06 | 2.05 | 2.49 | 3.13 | 3.45 |
| Initial hue | L | (—) | 85.8 | 86.9 | 87.3 | 87.3 | 86.8 | 86.5 |
| | a | (—) | −0.8 | −1.0 | −0.9 | −0.8 | −0.7 | −0.9 |
| | b | (—) | 8.2 | 6.5 | 6.0 | 6.4 | 6.1 | 6.3 |
| Hue after heating | L | (—) | 78.8 | 81.4 | 81.2 | 81.7 | 81.6 | 81.5 |
| | a | (—) | 1.6 | 1.3 | 1.0 | 1.3 | 1.2 | 1.1 |
| | b | (—) | 11.4 | 8.9 | 9.0 | 9.3 | 9.3 | 10.0 |
| Initial strength | Tmax | (N/mm$^2$) | 1.02 | 0.99 | 1.19 | 1.15 | 1.06 | 0.98 |
| Strength after heating | Tmax | (N/mm$^2$) | 0.80 | 0.80 | 0.92 | 0.91 | 0.83 | 0.84 |
| Initial elongation | Emax | (%) | 500 | 480 | 580 | 580 | 590 | 680 |
| Elongation after heating | Emax | (%) | 260 | 400 | 430 | 450 | 450 | 570 |

L value: higher is better
a value: lower is better
b value: lower is better
Tmax: higher is better
Emax: higher is better

TABLE 6

| Comp. Examples | | | 25 | 26 | 27 | 28 | 29 | 30 | 31 | 32 | 33 |
|---|---|---|---|---|---|---|---|---|---|---|---|
| Number of comp. example of filler used | | | 1 | 2 | 3 | 7 | 8 | 9 | 10 | 11 | 12 |
| Proportion of saturated fatty acid | SFa | (%) | 94.1 | 92.9 | 94.2 | 72.7 | 73.5 | 72.7 | 61.5 | 60.5 | 61.1 |
| Proportion of unsaturated fatty acid | UFa | (%) | 5.9 | 7.1 | 5.8 | 27.3 | 26.5 | 27.3 | 38.5 | 39.5 | 38.9 |
| Metallic components | Mg | (ppm) | 1486 | 2230 | 2196 | 1489 | 2234 | 2186 | 812 | 1482 | 1516 |
| | Fe | (ppm) | 295 | 132 | 284 | 275 | 115 | 278 | 76 | 119 | 186 |
| BET specific surface area | Sw | (m$^2$/g) | 15 | 15 | 15 | 15 | 15 | 15 | 15 | 15 | 15 |

TABLE 6-continued

| Comp. Examples | | | 25 | 26 | 27 | 28 | 29 | 30 | 31 | 32 | 33 |
|---|---|---|---|---|---|---|---|---|---|---|---|
| Treated rate | As | (mg/m$^2$) | 2.02 | 2.01 | 1.99 | 2.60 | 2.58 | 2.59 | 3.05 | 3.00 | 3.02 |
| Initial hue | L | (—) | 86.0 | 80.2 | 80.4 | 84.6 | 81.0 | 79.3 | 84.4 | 84.3 | 83.6 |
|  | a | (—) | −0.6 | 0.4 | 1.2 | −0.2 | 0.9 | 1.5 | −0.4 | 0.5 | 0.4 |
|  | b | (—) | 7.4 | 6.6 | 7.9 | 8.0 | 7.3 | 8.4 | 7.3 | 7.5 | 8.5 |
| Hue after | L | (—) | 80.5 | 75.5 | 74.4 | 77.2 | 74.4 | 71.9 | 79.0 | 77.2 | 76.3 |
| heating | a | (—) | 1.9 | 3.3 | 3.7 | 2.2 | 3.9 | 4.4 | 2.4 | 3.0 | 3.0 |
|  | b | (—) | 12.3 | 11.1 | 13.2 | 13.3 | 12.9 | 14.9 | 12.7 | 13.5 | 15.2 |
| Initial strength | Tmax | (N/mm$^2$) | 1.05 | 1.06 | 1.04 | 0.98 | 1.03 | 0.96 | 0.97 | 0.98 | 0.91 |
| Strength after heating | Tmax | (N/mm$^2$) | 0.81 | 0.84 | 0.82 | 0.76 | 0.73 | 0.72 | 0.64 | 0.63 | 0.59 |
| Initial elongation | Emax | (%) | 530 | 550 | 540 | 480 | 480 | 440 | 470 | 510 | 460 |
| Elongation after heating | Emax | (%) | 310 | 330 | 290 | 240 | 240 | 200 | 180 | 190 | 180 |

L value: higher is better
a value: lower is better
b value: lower is better
Tmax: higher is better
Emax: higher is better From Table 5 and Table 6, it is found that one component type polyurethane sealants typified by Examples 47 to 60 blended with the surface-treated calcium carbonate fillers in Examples 1 to 6, 10 to 12, 15, 17 to 19 and 21 have excellent heat resistance and color fastness.

INDUSTRIAL APPLICABILITY

As described above, the surface-treated calcium carbonate filler of the present invention is useful for a curable resin composition, and can provide a curable resin composition with excellent heat resistance, color fastness, strength and elongation.

The invention claimed is:

1. A surface-treated calcium carbonate filler for a curable resin composition, in which calcium carbonate synthesized using compact limestone is treated by a surface treatment agent, the surface-treated calcium carbonate filler satisfying the following formulae (1) to (4):

$$0 \leq Mg \leq 2000 \text{ ppm}, \quad (1)$$

$$0 \leq Fe \leq 200 \text{ ppm}, \quad (2)$$

$$70 \leq SFa \leq 100 \text{ wt \%, and} \quad (3)$$

$$0 \leq UFa \leq 30 \text{ wt \%}, \quad (4)$$

wherein:
Mg: a proportion ppm of magnesium contained in surface-treated calcium carbonate,
Fe: a proportion ppm of iron contained in surface-treated calcium carbonate,
SFa: a proportion wt % of saturated fatty acid in the surface treatment agent comprising a water-soluble monovalent salt of a fatty acid, and
UFa: a proportion wt % of unsaturated fatty acid in the surface treatment agent comprising a water-soluble monovalent salt of a fatty acid.

2. A curable resin composition containing the following components (A), (B) and (C):
(A) a curable resin having a crosslinkable silicon group,
(B) a crosslinkable curing catalyst, and
(C) the surface-treated calcium carbonate filler defined in claim 1.

3. A curable resin composition according to claim 2, wherein the curable resin having a crosslinkable silicon group (A) is at least one selected from the group consisting of silicone resins, modified silicone resins, acrylic silicone resins, silicone modified epoxy resins, silyl-terminated polyisobutylene resins, silylated acrylate resins and silylated urethane resins.

4. A curable resin composition according to claim 3, wherein the crosslinkable curing catalyst (B) is at least one selected from the group consisting of organometallic catalysts comprising tin, titanium, bismuth, zirconium and aluminum, amine compounds and boron compounds.

5. A curable resin composition according to claim 4, wherein the curable resin composition is a sealing material or an adhesive.

6. A curable resin composition according to claim 4, wherein the curable resin composition is a one component.

7. A curable resin composition according to claim 3, wherein the curable resin composition is a sealing material or an adhesive.

8. A curable resin composition according to claim 3, wherein the curable resin composition is a one component.

9. A curable resin composition according to claim 2, wherein the crosslinkable curing catalyst (B) is at least one selected from the group consisting of organometallic catalysts comprising tin, titanium, bismuth, zirconium and aluminum, amine compounds and boron compounds.

10. A curable resin composition according to claim 9, wherein the curable resin composition is a sealing material or an adhesive.

11. A curable resin composition according to claim 9, wherein the curable resin composition is a one component.

12. A curable resin composition according to claim 2, wherein the curable resin composition is a sealing material or an adhesive.

13. A curable resin composition according to claim 2, wherein the curable resin composition is a one component.

14. A curable resin composition containing the following components (D), (E) and (F):
(D) at least one curable resin selected from the group consisting of polyurethane resins, polysulfide resins and modified polysulfides,
(E) a curing catalyst, and
(F) the surface-treated calcium carbonate filler defined in claim 1.

15. A curable resin composition according to claim 14, wherein the curable resin composition is a one component.

* * * * *